May 10, 1938.  L. A. CHAMBERS  2,116,560
BEDPAN COVER CUSHION
Filed Dec. 31, 1936

Inventor
Laura A Chambers
By Rodney Bedell
Attorney

Patented May 10, 1938

2,116,560

UNITED STATES PATENT OFFICE 2,116,560

BEDPAN COVER AND CUSHION

Laura A. Chambers, St. Louis, Mo.

Application December 31, 1936, Serial No. 118,502

7 Claims. (Cl. 4—113)

The invention relates to covers for application to bed pans such as are in general use with invalids and particularly in hospitals.

The main object of the invention is to facilitate the application of such a cover to the bed pan and its removal therefrom and at the same time have the cover secure in position on the pan irrespective of tendencies to displace or remove the cover as the pan and cover are slid under the patient or as the patient may move while upon the pan.

Another object of the invention is to minimize contact between the cover and matter discharged into the pan so that the cover will not be so quickly or so thoroughly soiled as occurs with many devices with which the inventor is familiar.

Another object of the invention is to facilitate the insertion of the cover in a sterilizer.

Preferably the cover includes a cushion section and another object of the invention is to hold the cushion in proper position which is difficult, particularly with heavy patients, as the movement of the pan under the patient tends to roll the cushion out of its proper position.

In the accompanying drawing illustrating a selected embodiment of my invention—

Figure 1:
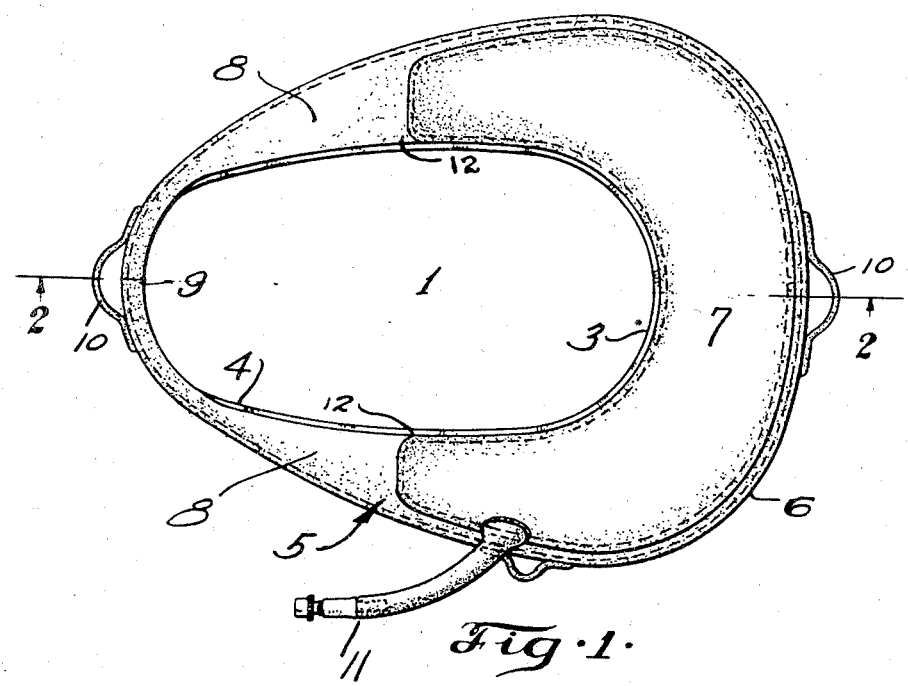
Figure 1 is a top view of the cover applied to a bed pan.
Figure 2:
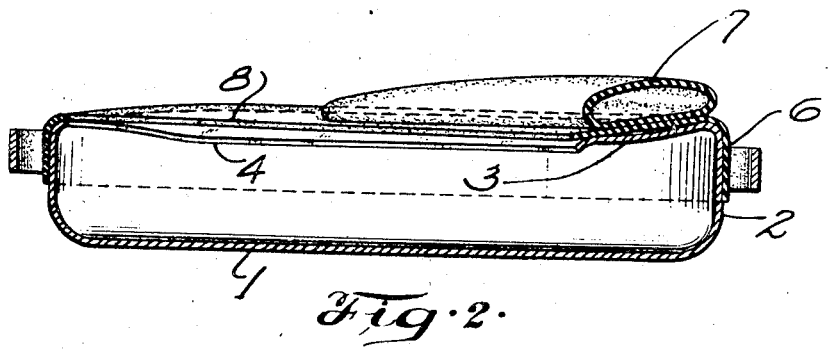
Figure 2 is a vertical section along the longitudinal axis of the pan and cover.

The pan is of a familiar type having a generally oval or egg shaped contour with a substantially flat bottom wall 1, a substantially continuous upright side wall 2, and a depressed upper rim 3 extending around the right hand end of the pan. Rim 3 supports the patient's body and may terminate intermediate the ends of the pan or may include continuations 4 as shown extending along the sides of the pan to the end opposite the wide rim portion.

The details of the pan are unimportant and do not constitute any part of the present invention.

The cover comprises a flat top member 5, a depending band 6 and preferably a cushion-forming tube 7. Preferably all these parts are of rubber and flexible and elastic throughout, but it is practical to make some of the parts, and particularly the parts under the cushion, of non-elastic material. When the cover is applied to the pan, band 6 takes an annular form of oval contour corresponding to the outer periphery of member 5 which has an opening giving the member an oval inner periphery corresponding generally to the opening formed by the pan rim parts 3 and 4. Member 5 is of substantial width between the arcuate portions defining its inner and outer peripheries at the right hand end of the cover which underlies cushion 7. Triangular shaped gusset-like parts 8 extend from the ends of the wide portion of the cover towards the opposite end of the cover and band, and the opposing edges of parts 8 converge towards each other and merge in a strip 9 of restricted width.

Strips 8 function to anchor the ends of the cushion, to prevent its movement across the pan, and to hold band 6 against slipping down over the bottom edge of the pan. At the same time cushion 7 may be intentionally shifted lengthwise of the pan by slipping the end portions of band 6 up and down side wall 2.

One or more loops 10 on band 6 facilitate removal and application of the cover to and from the pan. An ordinary pump connection and valve is indicated at 11. With the cover attached as illustrated and described, band 6 is stretched over the outer face of the pan wall to hold the outer periphery of member 5 in place. Member 5, and particularly parts 8, are also stretched, tending to draw all the inner periphery of the cover towards the center or longitudinal axis of the pan. Any tendency of the cover or the cushion to slide from the intended position is adequately resisted by the elastic elements and by their shape and configuration as described and particularly by the converging elements extending from points 12 towards the left hand end of the pan.

The cover is securely attached to the pan without any straps over the outside of the pan and without any hooks or clips about the inner edge of the pan rim for holding the cover in place. Any such additional parts would be difficult to clean and are a source of contamination. Furthermore, they hinder quick adjustment of the cover and cushion to accommodate the patient and usually they are hard and may discomfort the patient. This is particularly important in cases of fractured pelvic bones where the least pressure at a sensitive spot may be very painful.

As there are no straps and fastenings to undo after the pan has been used, the cover may be removed quickly and without contaminating the hands of the attendant with any matter in the pan. There are no reentrant folds where foreign matter collects. The cover, including cushion 7, being formed entirely of flexible material, is easily bundled up and inserted in the ordinary hospital instrument sterilizer.

Notwithstanding the simplicity of the cover and the ease with which it may be applied and removed and cleaned, it adequately protects the patient's flesh from contact with the pan and, with the cushion, affords a yielding support which contributes materially to the patient's comfort.

The cushion may be formed of soft or sponge rubber throughout or, if desired, may be omitted entirely, as may loops 10, and other details of the structure may be varied without departing from the spirit of the invention which provides for the secure fastening of the flat cover of the pan rim in place as described without unnecessary fittings. The exclusive use of such modifications of the invention as come within the scope of the claims is contemplated.

I claim:

1. A bed pan cover comprising a flat approximately doughnut-shaped upwardly facing member having a flexible outer periphery and a flexible inner periphery, the zone between said peripheries varying in width, the widest portion being adjacent one end of the member, and the sides of the inner periphery converging towards each other from the wider portion of said member to the opposite end thereof, and a band depending from the outer periphery of said member, said band being of elastic material constructed and arranged to be stretched about the side wall of a bed pan to which the cover is applied and said member being of elastic material throughout its inner periphery and constructed and arranged to be stretched over the top of a bed pan with its inner periphery following the line of the upper opening in the bed pan substantially throughout the length thereof.

2. A bed pan cover comprising an annular upright band having an upwardly facing inturned upper lip of substantial width throughout an arc approximating half of the perimeter of said band and traversing the longitudinal axis of the cover and having a flexible inner periphery, said upwardly facing lip including relatively narrow elastic elements extending from the ends of said arc to the portion of said band most remote from said arc, said elements tending to pull the inner periphery of said lip towards said axis.

3. A bed pan cover comprising an elastic band arranged to be stretched over the upright outer face of a bed pan and including an inturned upwardly facing annular upper rim of substantial width at one end and of relatively restricted width at the other end, the inner periphery of said rim being elastic and arranged, when stretched, to extend above the plane of the inner edge of a top wall of the bed pan to which the cover is attached.

4. In a bed pan cover, an upwardly facing annular top member having an inner periphery and an outer periphery, a band depending from said outer periphery, said top member and said band being of elastic material and shaped so that upon application to a bed pan said inner periphery and said band will be stretched substantially throughout their lengths to securely retain said cover in place on the pan.

5. A bed pan cover as specified in claim 4 in which a substantial part of the upwardly facing portion of the cover is widened more than the remainder of said portion and a cushion is attached to said part adjacent to the inner and outer peripheries and is held against rolling movement by the stretching of the band and the top member along its inner periphery.

6. A bed pan cover comprising an annular upright band, an annular horizontal flange projecting inwardly from the upper edge of said band and comprising a widened part around one end thereof, a cushion overlying and secured to said widened flange part substantially throughout its width, and relatively narrow continuations of said flange extending from the inner edges of said widened part to the opposite end of said band, said band and continuations being of elastic material to hold said flange and cushion firmly in place on a bed pan irrespective of retaining elements for engaging the inner edge of a bed pan opening.

7. A bed pan cover comprising a flat flexible top sheet and comprising an end portion having widely spaced inner and outer arcuate contours and also comprising elongated triangular-shaped upwardly facing parts extending from said end portion, the opposing edges of said parts converging and merging near the other end of the cover, a cushion formed on said end portion, a depending band at the outer periphery of said top sheet, said band and triangular parts being of elastic material and being stretched substantially throughout their area when the cover is applied to a bed pan so that the cover may be retained without other holding elements.

LAURA A. CHAMBERS.